W. J. P. MOORE.
INTERNAL COMBUSTION ENGINE.
APPLICATION FILED OCT. 21, 1915. RENEWED JULY 5, 1918.
1,275,288.
Patented Aug. 13, 1918.
4 SHEETS—SHEET 2.
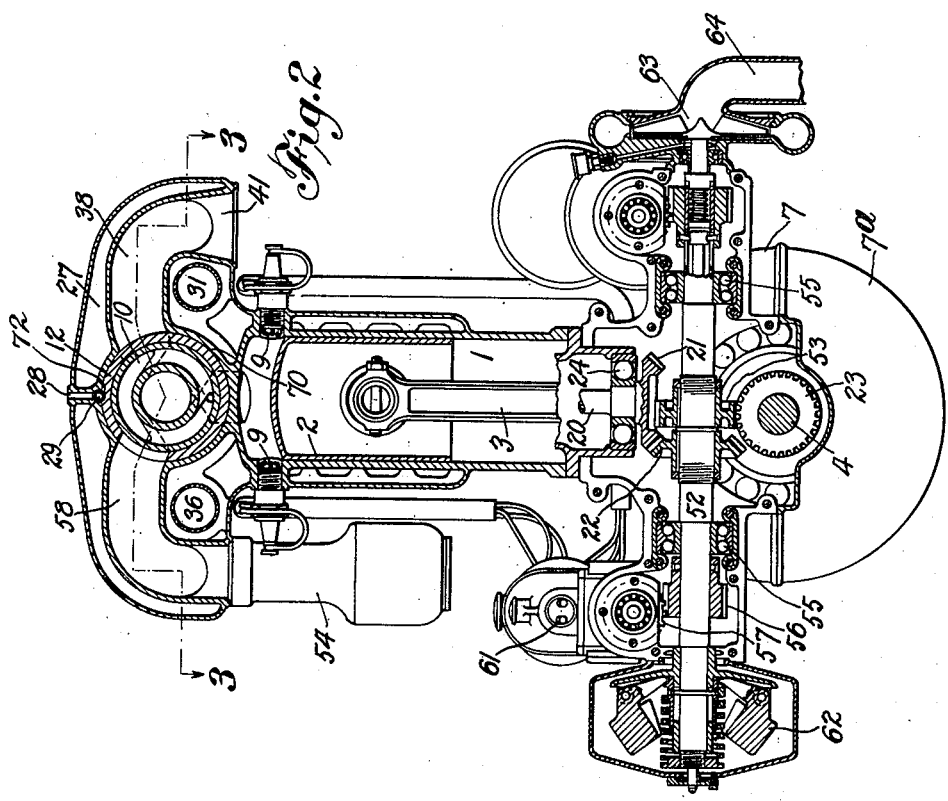
Inventor
William J. P. Moore
per Fred R. Tasker
Atty W. J. P. MOORE.
INTERNAL COMBUSTION ENGINE.
APPLICATION FILED OCT. 21, 1915. RENEWED JULY 5, 1918.
1,275,288.
Patented Aug. 13, 1918.
4 SHEETS—SHEET 3.
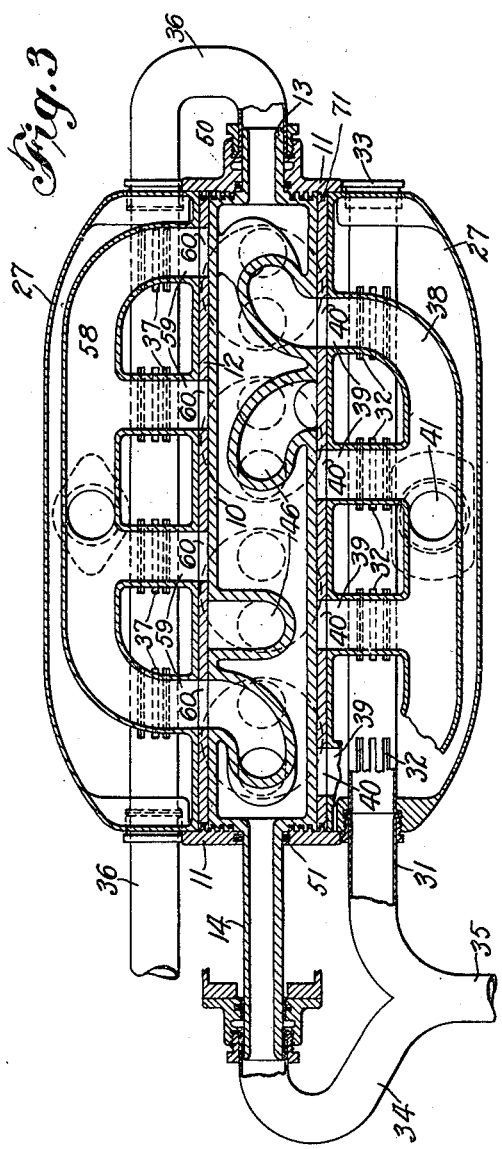
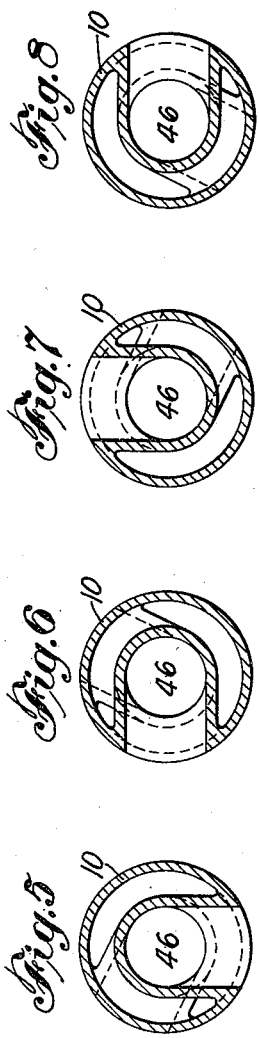
Inventor
William J. P. Moore
per Fred E. Asker
Atty.

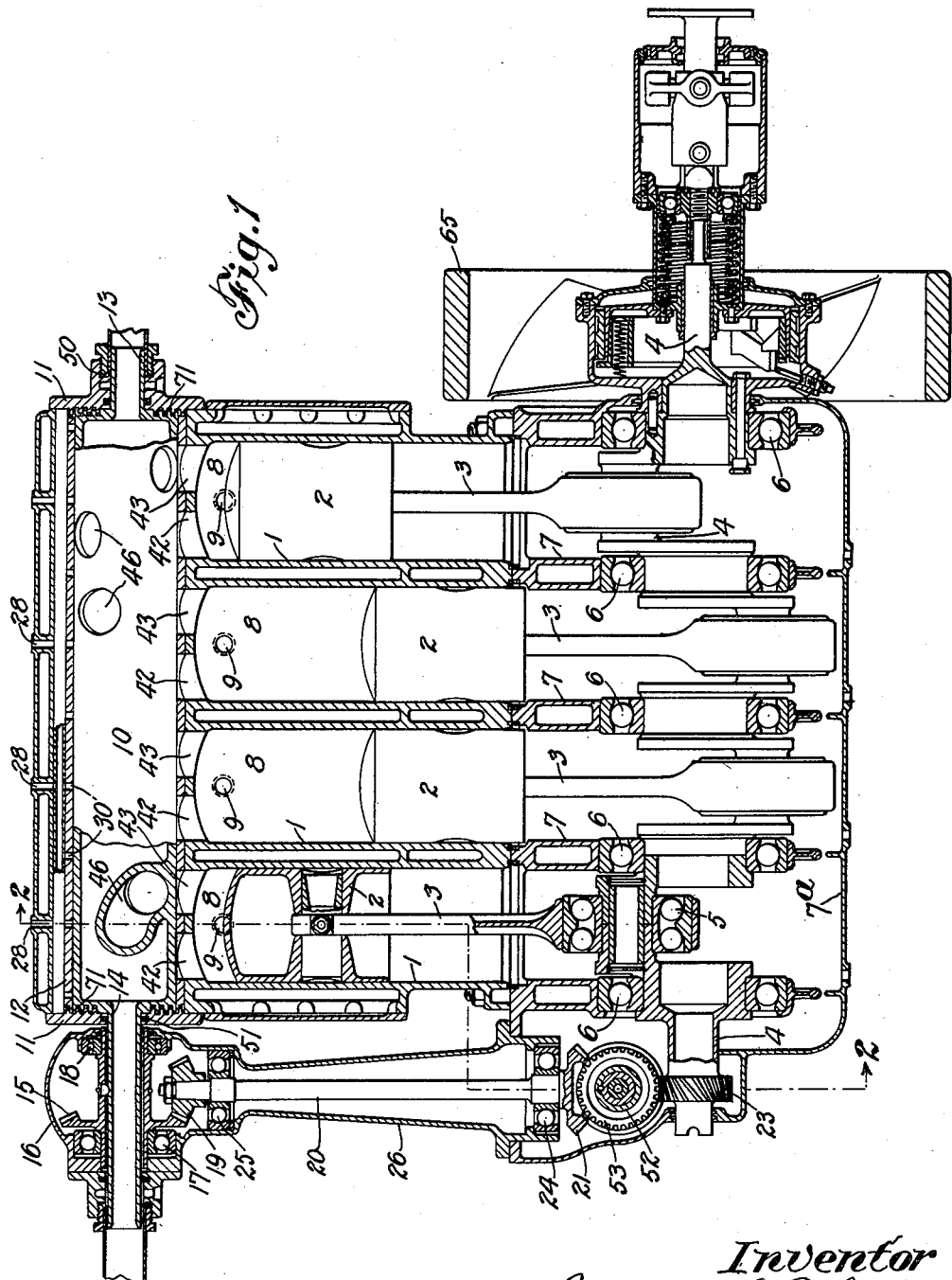

W. J. P. MOORE.
INTERNAL COMBUSTION ENGINE.
APPLICATION FILED OCT. 21, 1915. RENEWED JULY 5, 1918.
1,275,288.
Patented Aug. 13, 1918.
4 SHEETS—SHEET 4.
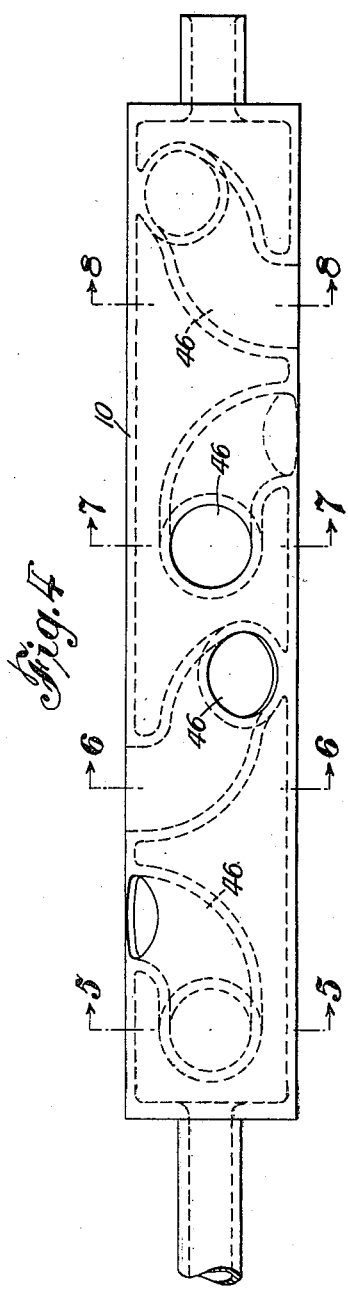
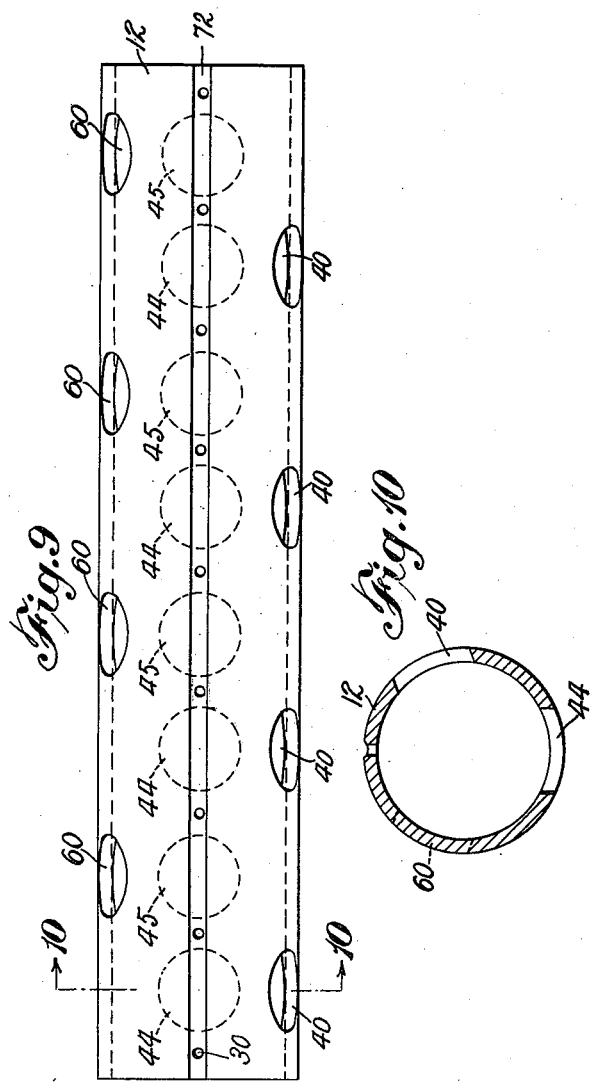
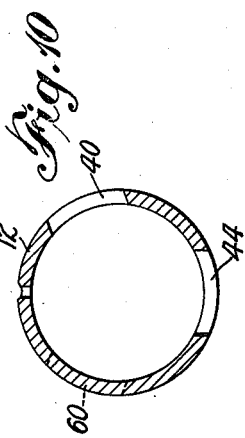
Inventor
William J. P. Moore
per Fred E. Tasker
Atty.

UNITED STATES PATENT OFFICE.

WILLIAM J. P. MOORE, OF NEW YORK, N. Y.

INTERNAL-COMBUSTION ENGINE.

1,275,288.   Specification of Letters Patent.   Patented Aug. 13, 1918.

Application filed October 21, 1915, Serial No. 57,044. Renewed July 5, 1918. Serial No. 243,466.

*To all whom it may concern:*

Be it known that I, WILLIAM J. P. MOORE, a citizen of the United States, residing at New York city, in the county of New York and State of New York, have invented certain new and useful Improvements in Internal-Combustion Engines, of which the following is a specification, reference being had therein to the accompanying drawing.

The invention refers to certain new and useful improvements in internal combustion engines or motors. The object is to increase the efficiency without complicating the construction, and make it possible to develop very large power with a small engine. The invention consists primarily in novel combined inlet and exhaust valve means for introducing the mixture and scavenging the cylinders after the explosions, and in various and numerous details and peculiarities in the construction, arrangement and combination of the various parts, substantially as will be hereinafter described and claimed.

In the accompanying drawing illustrating my invention:

Figure 1 is a vertical longitudinal section of my improved gas engine;

Fig. 2 is a cross section of the same on the line 2, 2 of Fig. 1;

Fig. 3 is a sectional plan view on the line 3, 3 of Fig. 2;

Fig. 4 is an enlarged detail side view of the rotary inlet and exhaust valve;

Fig. 5 is a cross-section of the same on the line 5, 5 of Fig. 4;

Fig. 6 is a cross-section of the same on the line 6, 6 of Fig. 4;

Fig. 7 is a cross-section of the same on the line 7, 7 of Fig. 4;

Fig. 8 is a cross-section of the same on the line 8, 8 of Fig. 4;

Fig. 9 is an enlarged detail side view of the lining for the valve casing, which lining surrounds the rotary valve.

Fig. 10 is a cross-section of the same on the line 10, 10 of Fig. 9.

Similar characters of reference designate corresponding parts throughout the different figures of the drawing.

An engine built in accordance with the principles of my present invention may obviously have any number of cylinders. In the present example, however, I have shown four of these cylinders 1, each containing a piston 2, to which is connected a rod 3. The several connecting rods 3 are loosely connected to the crank shaft 4 by means of ball bearing connections 5, and said crank shaft 4 is itself mounted in ball bearings 6 in a crank casing consisting of the main part 7 and the removable bottom portion $7^a$, although said crank case may be otherwise built if desired. The explosion chamber 8 in the upper end of each cylinder 1 is provided with suitable means for providing a spark for ignition purposes, and I preferably employ a double ignition system consisting of spark plugs 9 projecting into opposite sides of the explosion chamber, as shown in Fig. 2, though it is obvious that any desired means for making the spark may be employed in lieu of the devices shown.

10 denotes a rotary valve having the function of a combination supply and exhaust valve. It is supported in a horizontal position on the top of the main frame above the cylinders 1 and within a casing 70, which latter forms a part of the wall or frame of a water jacket 27, there being a cylindrical lining 12 surrounding the said valve and within which it rotates neatly and closely, said lining 12 being provided with various ports which register with the ports in the valve in a manner to be presently explained, and being supported within the casing 70. The valve 10 is hollow and is provided at one end with a tubular extension or water pipe 13 arranged to pass through a suitable packing gland 50 on the cover plate 11 at one end of the valve casing, while at the other end, said rotary valve 10 is provided with another tubular extension or water pipe 14 which passes through a properly packed opening 51 in the other cover plate 11 at the other end of the valve casing. The tubular extension 13 telescopes with a water-tight joint with the water pipe 36, while the other tubular extension 14 telescopes with a water-tight joint with the water pipe 34. Through the tubular extensions 13 and 14 and the hollow interior of the valve 10 passes the circulating water for cooling the valve, the course of which through the pipes and passages will be hereinafter more fully set forth. The valve 10 has more or less endwise play between the ends thereof and the cover plates 11, and in order to permit this and yet prevent any possibility of leakage around the valve, I employ suitable packing between the ends of the valve and the covers 11, as for example, the labyrinth rings 71, consisting of a series of concentric circular ribs on the covers 11 engaging concentric circular grooves on the ends of the valve, packings being interposed between the parts, but it will be understood that another different kind of means for preventing leakage and yet allowing the valve to have the requisite play may be adopted and used if preferred.

To one of the tubular extensions, as for example extension 14, is connected a bevel gear wheel 15, protected by a housing 16 and supported by ball bearings 17 and 18. The means for connecting the gear wheel 15 to the tube 14 consists of a sleeve with which the gear is provided, which sleeve is keyed to the tube 14. Said bevel gear wheel meshes with a bevel pinion 19 on the upper end of a vertical shaft 20 on the lower end of which is a bevel pinion 21 engaging a bevel gear wheel 22 on shaft 52, on which shaft is also a spiral gear wheel 53 that is actuated by the gear 23 on the main crank shaft 4. The vertical shaft 20 carrying the bevel pinions 19 and 21 is revolubly carried in ball bearings 24 and 25 and is protected by an inclosing hollow standard 26. Thus it will be seen that by means of the intervening instrumentalities noted, the main crank shaft 4 will transmit power to the rotary valve 10 for the purpose of revolving the same at the proper speed, the parts being so proportioned and related that the revolution of the rotary valve will be properly timed to correspond with the movements of the pistons 2 in the cylinders 1.

Supported on the casting of the cylinders 1 is a suitable water jacket or cooling chamber 27. In the central upper portion of this chamber are vertical oil tubes 28 receiving their supply of lubricant from some suitable source, the lower ends of which tubes 28 connect with a horizontal tube 29 running above and engaging a groove 72 in the valve lining 12 and having perforations therein coinciding with the perforations 30 in said lining 12 so that lubricant may be admitted to the surface of the rotary valve 10 which is in frictional contact with the inner surface of the lining 12. Running through the wall of the water jacket 27 on one side of the valve 10 is a horizontal pipe 31, having at intervals lateral slots or openings 32 through which water can be discharged into the interior of the chamber 27 (see Fig. 3). This pipe 31, which I have said is on one side of the rotary valve 10, is closed at 33 at one end of said jacket 27, while the other end connects with a pipe 34, which is united loosely but with a water-tight coupling to the tubular extension 14 of the rotary valve 10, the two pipes 31 and 34 merging into a single supply pipe 35 leading to any suitable pumping mechanism so that the cooling water which is delivered through pipe 35 divides into two parts and is carried into the water jacket 27 through the pipe 31, and is also carried through pipes 34 and 14 into the interior of the rotary valve from which it emerges through the other tubular extension 13, and enters a curved pipe 36, coupled loosely to said tube 13 with a water-tight joint, which in like manner with pipe 31 passes through the wall of the water jacket 27 on the opposite side of the rotary valve 10 and emerges therefrom at the other end of the chamber 27 and runs back to connect with the source of supply so that there may be a complete water circulation, said pipe 36, or a portion of it which is within the chamber 27 being provided with parallel slots or openings 37, through which water can be received from chamber 27. Within the chamber 27 and immersed in the cooling liquid therein are situated at opposite sides of the rotary valve 10 and the cylindrical lining 12 therefor, exhaust and inlet manifolds 38 and 58 respectively. The exhaust manifold 38 has four branches 39 which connect with the lateral ports 40 in the lining 12 and carry the spent products of combustion after each explosion outwardly to the atmosphere through the exhaust opening 41. The inlet manifold 58 has four branches 59 which connect with the other lateral ports 60 in the lining 12 and admit the explosive mixture to the valve 10 from the carbureter 54.

The upper end of each of the cylinders 1 is provided with two circular openings 42 and 43, the opening 42 in each case being an inlet port to receive the explosive mixture of air and gas, while the opening 43 is an outlet port through which the exploded gas is exhausted. I have already stated that the lining 12 for the rotary valve 10 is provided with a series of circular lateral exhaust ports 40 and an opposite series of lateral inlet ports 60 (see Fig. 3). All these ports are on the sides of the lining 12, as shown in Figs. 9 and 10. This lining also is provided with a series of circular ports 44 on the bottom, which register with the inlet ports 42 in the cylinders 1, and also with a series of circular ports 45 that register with the cylinder exhaust ports 43.

The rotary valve 10 forms the most important feature of my present improved engine. It is of an elongated cylindrical form and is hollow, but is provided with a series of curved or cross passages cast therein and extending across the hollow interior from one point in the outer surface of the valve to another point. In the present example of my invention there are four of these curved passages 46. They are clearly indicated in Figs. 3 and 4. Of course the number of said passages and their shape may vary greatly in different types of engines, corresponding to the number of cylinders.

The curvature thereof may also vary within considerable limits, but generally speaking the curvature will accord with that shown where it is S-shaped, or a double U-shape, having a double curvature, or two loops, starting in as the passage does from a point on the surface of the valve, as shown in Figs. 5, 6 and 7, and making a double turn and emerging on the other side at a certain point on the valve surface.

Further, it will be noted that the point where each S-shaped passage begins is circumferentially some distance from the point where it ends, and also that the different passages have their inlet and outlet ends in different axial lines of the valve so that they may operate with different functions at the same time, that is to say, while one is admitting the mixture, another may be exhausting the spent products, and others may be shut off so as to be idle at the time, all accordingly as the pistons and cylinders are relatively placed, and these S-shaped passages are, therefore, placed at an angle circumferentially to each other, which angle varies with the time of the angular opening or closing of the cylinder ports. The purposes of these passages 46 is to connect the cylinder inlet ports 42 with the source of the explosive mixture that enters through the manifold 58 and also to connect the cylinder exhaust ports 43 with the exhaust manifold 38 which discharges to the atmosphere at the proper time. It will be understood, moreover, that these passages 46 execute both functions, namely, that of supplying the mixture and that of relieving the exhaust, each passage serving in one position of the rotary valve as an inlet passage, and in another position as a discharge passage.

Referring now to Figs. 4 and 9, as also the sectional views in Figs. 5, 6, 7 and 8, it will be seen that in one position of the passages 46 they will connect one of the ports 44 in the bottom of the lining 12 (which port coincides with a cylinder inlet port 42) with one of the lateral ports 60 in the lining (which coincides with one of the inlet ports 59 of the manifold 58) while in another position of the rotary valve 10, after the same has been partly rotated, the curved passages 46 will be carried around to a different position where a connection will be made between one of the ports 45 in the bottom of the lining 12 (which coincides with a cylinder exhaust port 43) with one of the lateral ports 40 of the lining 12 (which coincides with one of the exhaust ports 39 belonging to the exhaust manifold 38). But it will be manifest that the angularity of the position of these S-shaped passages is an important feature and depends obviously upon the number of the cylinders 1, there being, of course, any number of cylinders, and a corresponding number of passages 46.

While this is the function of each of these passages, it will be understood, as already stated, that they are so related to each other as to perform different offices at different times, that is to say, while one is letting in a charge of the explosive mixture, another may be connecting the ports which permit of a discharge of the spent products, while others are occupying such a position that they are closed and are not making any connections between the ports, at which time the pistons are compressing the charge received previously, but it is unnecessary to follow in detail the cycle of movements of the various pistons or the changes in position of the different passages 46 belonging to the series of such passages inasmuch as this will be readily manifest to any one skilled in the art. It is very important in my invention that the rotary valve should perform its functions accurately, and it will be found that a combined inlet and exhaust valve of this character and of the rotary type, requiring no grinding and operated with ease, will achieve excellent results in practice and develop a high efficiency.

I have already referred to the horizontal shaft 52 which drives the vertical shaft 20 by means of which the rotary valve is actuated at the proper time to correspond with the movements of the pistons. Said shaft 52 (see Fig. 2) is supported in ball bearings 55 and has thereon a gear wheel 56 which drives another gear wheel 57 belonging to the magneto 61. On this shaft 52 is also a governor mechanism 62, while at the opposite end thereof, said shaft 52 drives the centrifugal pump 63 for carrying water into the pipe 64, and thence into the pipes 34, 35 and 36 belonging to the water cooling system of the engine. On the main crank shaft 4 is a fly wheel 65.

I have already referred to the oil pipe 29 as engaging the groove 72 in the lining 12. By referring to Fig. 2 it will be seen that in the valve casing or wall of the water chamber directly opposite the groove 72 is a corresponding groove which likewise receives a part of the pipe 29 so that said pipe forms a locking device between the lining 12 and the frame surrounding the valve. When the parts are assembled, the placing of the pipe 29 in its position in the grooves and then forcing the lining 12 into place enables said lining to be accurately centered and positioned so that the ports therein will register precisely with the various cylinder and other ports adjacent thereto. The engagement of the lubricant pipe 29 with the grooves in the lining 12 and the valve casing is of considerable importance.

Many changes may be made in the precise construction and relative arrangement of the different parts, and their proportions and shape for the purpose of contributing to a more excellent result in practice, and I therefore reserve the liberty of varying and readapting the parts according to the emergencies and exigencies that may come to pass in the actual use of the engine. It will be obvious, moreover, that instead of the gearing mechanism which connects the main crank shaft with the rotary valve for rotation with the latter, I can substitute various equivalents such as a chain drive or a friction drive, or other driving connections.

Having thus described my invention, what I claim as new and desire to secure by Letters Patent, is:

1. In an internal combustion engine, the combination with a cylinder, having inlet and exhaust ports in one end thereof, of a piston in said cylinder, a rotary valve having an S-shaped transverse passage therein, and a sleeve surrounding said valve having ports communicating with the cylinder ports and also lateral exhaust and inlet ports, and supply and exhaust means connecting with said lateral ports in the sleeve, and a lubricant tube engaging a longitudinal groove in the valve sleeve and having outlet openings registering with openings in the sleeve for conveying the lubricating medium to the surface of the rotary valve.

2. In an internal combustion engine, the combination with a cylinder having inlet and exhaust ports in one end thereof, of a piston in said cylinder, a rotary inlet and exhaust valve having S-shaped ports therein adapted to register alternately with the cylinder inlet and exhaust ports, a ported sleeve surrounding said valve, and means for circulating cooling water through the valve, and a lubricant tube engaging a longitudinal groove in the valve sleeve.

3. In an internal combustion engine, the combination with the cylinders, each having separate inlet and exhaust ports in the end thereof, pistons in said cylinders, a rotary exhaust valve having S-shaped transverse passages therein adapted to register alternately with the cylinder ports, a ported sleeve surrounding said valve, an inlet manifold for the explosive mixture, an exhaust manifold, with the ports of which inlet and exhaust manifolds the valve passages are adapted to register, together with a lubricant tube engaging a longitudinal groove in the valve sleeve for conveying lubricant to the rotary valve.

4. In an internal combustion engine, the combination with a cylinder having inlet and exhaust ports in one end thereof, of a piston in said cylinder, a stationary port-provided sleeve, and a rotary inlet and exhaust valve arranged to rotate within said sleeve and having S-shaped ports alternately registering with the cylinder inlet and exhaust, and a lubricant tube engaging a longitudinal groove in the valve sleeve and having outlet openings registering with openings in the sleeve for conveying a lubricant medium to the surface of the rotary valve.

5. In an internal combustion engine, the combination with a cylinder having inlet and exhaust ports, of a piston in said cylinder, a rotary valve, a lining surrounding said valve, said lining having a longitudinal groove therein provided with orifices leading to the surfaces of the rotary valve, a stationary oil tube seated in said groove and provided with inlet passages for admitting a lubricating medium which can be conveyed to the rotary valve.

6. In an internal combustion engine, the combination with the cylinders, each having separate inlet and exhaust ports in one end thereof, of pistons in said cylinders, and a rotary inlet and exhaust valve having S-curved passages therein, the ends of which passages are in line with the cylinder ports so that they may register alternately with the said cylinder ports, inlet means for the explosive mixture, exhaust means, said inlet and exhaust means being laterally connected with the valve passages and through them with the cylinder, a ported sleeve surrounding the rotary valve, and a lubricant tube engaging a longitudinal groove in said sleeve, and having outlet openings registering with openings in the sleeve.

7. In an internal combustion engine, the combination of the cylinders each having separate inlet and exhaust ports, pistons in said cylinders, a rotary inlet and exhaust valve having transversely-curved passages, each of which serves alternately to connect with the inlet and the exhaust ports of the cylinders and admit at one time the fuel supply and at another time permit the exhaust, and a ported lining interposed between the rotary valve and the cylinders and also between the rotary valve and the inlet and exhaust mechanism, and a lubricant tube seated in a longitudinal groove in the ported lining, and engaging also a groove in the valve casing which surrounds the ported lining.

In testimony whereof I affix my signature.

WILLIAM J. P. MOORE.